United States Patent
Tada et al.

(10) Patent No.: US 9,070,919 B2
(45) Date of Patent: Jun. 30, 2015

(54) POSITIVE ELECTRODE TAB LEAD, NEGATIVE ELECTRODE TAB LEAD, AND BATTERY

(75) Inventors: Kiyoshi Tada, Oyama (JP); Daisuke Hashimoto, Oyama (JP); Satoshi Yamazaki, Sagamihara (JP)

(73) Assignee: Showa Denko Packaging Co., Ltd., Kanagawa (JP)

( * ) Notice: Subject to any disclaimer, the term of this patent is extended or adjusted under 35 U.S.C. 154(b) by 603 days.

(21) Appl. No.: 13/141,141

(22) PCT Filed: Nov. 6, 2009

(86) PCT No.: PCT/JP2009/068986
§ 371 (c)(1),
(2), (4) Date: Sep. 1, 2011

(87) PCT Pub. No.: WO2010/073827
PCT Pub. Date: Jul. 1, 2010

(65) Prior Publication Data
US 2011/0305945 A1    Dec. 15, 2011

(30) Foreign Application Priority Data

Dec. 22, 2008  (JP) .................................. 2008-325521
May 26, 2009   (JP) .................................. 2009-126176

(51) Int. Cl.
*H01M 2/06* (2006.01)
*H01M 2/26* (2006.01)
(Continued)

(52) U.S. Cl.
CPC ............... *H01M 2/06* (2013.01); *H01M 2/266* (2013.01); *H01M 2/30* (2013.01); *H01M 2/305* (2013.01); *H01M 2/32* (2013.01); *H01M 10/052* (2013.01)

(58) Field of Classification Search
CPC ......... H01M 2/06; H01M 2/305; H01M 2/30; H01M 2/266; H01M 2/32; H01M 10/052
USPC ................................... 429/179, 178, 163, 122
See application file for complete search history.

(56) References Cited

U.S. PATENT DOCUMENTS 3,140,196 A  *  7/1964  Lacy et al. .................... 428/215
6,267,790 B1     7/2001  Daroux et al.
(Continued)

FOREIGN PATENT DOCUMENTS

JP     11-067281 A    3/1999
JP     H11-067281  *  3/1999  ............ H01M 10/40
(Continued)

OTHER PUBLICATIONS

Official Communication issued in International Patent Application No. PCT/JP2009/068986, mailed on Jan. 26, 2010.
(Continued)

*Primary Examiner* — Patrick Ryan
*Assistant Examiner* — Aaron Greso
(74) *Attorney, Agent, or Firm* — Keating & Bennett, LLP (57) ABSTRACT

The present invention is to provide a positive tab lead capable of being connected with each other with a sufficient connection strength at a low energy cost. It is constituted such that a partial coating layer (13) made of nickel, tin or solder is formed on at least a part of a region of an aluminum plate (11) exposed to an outside of an outer cover. It is preferable to form a chitosan layer (14) containing one or more compounds selected from the group consisting of chitosan and chitosan derivatives on the surface of the tab lead.

5 Claims, 4 Drawing Sheets (51) Int. Cl.
  *H01M 2/30* (2006.01)
  *H01M 2/32* (2006.01)
  *H01M 10/63* (2014.01)
  *H01M 10/052* (2010.01)

(56) References Cited

U.S. PATENT DOCUMENTS

2004/0029001 A1\* 2/2004 Yamazaki et al. ............ 429/176
2008/0102362 A1 5/2008 Nii et al.

FOREIGN PATENT DOCUMENTS

| JP | 2000-215879 | A | | 8/2000 | | |
| JP | 2001-076706 | A | | 3/2001 | | |
| JP | 2001-167752 | A | | 6/2001 | | |
| JP | 2001-332240 | A | | 11/2001 | | |
| JP | 2003-077451 | A | | 3/2003 | | |
| JP | 2003-86070 | A | | 3/2003 | | |
| JP | 2003-123733 | A | | 4/2003 | | |
| JP | 2004-063132 | A | | 2/2004 | | |
| JP | 2004-063133 | | \* | 2/2004 | ............ | H01M 2/30 |
| JP | 2004-063133 | A | | 2/2004 | | |
| JP | 2004-127839 | A | | 4/2004 | | |
| JP | 2004-403874 | | \* | 4/2004 | ............ | H01G 9/155 |
| JP | 2006-20577 | | \* | 8/2006 | ............ | H01M 10/40 |
| JP | 2008-027771 | A | | 2/2008 | | |
| JP | 2008-186779 | A | | 8/2008 | | |
| WO | 2008/044763 | A1 | | 4/2008 | | |

OTHER PUBLICATIONS

Official Communication issued in corresponding European Patent Application No. 09834631.5, mailed on Apr. 7, 2014.

\* cited by examiner

POSITIVE ELECTRODE TAB LEAD, NEGATIVE ELECTRODE TAB LEAD, AND BATTERY

TECHNICAL FIELD

The present invention relates to a positive tab, lead and a negative tab lead preferably used as a tab lead for, e.g., a secondary battery, such as, e.g., a lithium battery, or a tab lead for, e.g., a capacitor.

In this specification and claims, the language of "aluminum" is used to mean to include aluminum and its alloys, and the language of "copper" is used to mean to include copper and its alloys. Furthermore, in this specification and claims, the language of "battery" is used to mean to include not only a battery, such as, e.g., a secondary, battery but also a capacitor.

TECHNICAL BACKGROUND

A secondary battery (e.g., a nonaqueous electrolyte lithium secondary battery) or a capacitor is provided with a tab lead for taking out electricity. Conventionally, an aluminum plate was used as a positive tab lead, and a copper plate was used as a negative tab lead (see Patent Document 1).

In the case of using such a battery as a power source for, e.g., an automobile, it is required to take out a large current, and therefore a plurality of unit cells are electrically connected to constitute an assembled battery. In other words, the electrode terminals (tab leads) of a plurality of unit cells are connected to constitute an assembled battery. In many cases, conventionally, such a tab lead connection was performed by welding.

PRIOR ART DOCUMENTS

Patent Documents

[Patent Document 1] Japanese Unexamined Laid-open Patent Publication No. 2008-27771 (JP-2008-27771, A)

SUMMARY OF INVENTION

Problems to be Solved by the Invention

In cases where tab leads are connected by welding as in the aforementioned prior art, there was a problem that a sufficient connection strength could not be obtained. Furthermore, in the case of connecting them by welding, there was a problem that the energy cost was high.

The present invention was made in view of the aforementioned technical background, and aims to provide a positive electrode, a negative electrode, and a battery capable of connecting tab leads with each other with a sufficient connection strength at lower energy cost.

Means for Solving the Problems

In order to attain the aforementioned objects, the present invention provides the following means.

[1] A positive tab lead characterized in that a partial coating layer made of nickel, tin or solder is formed on at least a part of a region of an aluminum plate to be exposed to an outside of an outer cover.

[2] The positive tab lead as recited in the aforementioned Item 1, wherein a surface roughness Ra of the aluminum plate is 0.03 to 0.5 μm.

[3] The positive tab lead as recited in the aforementioned Item 1, wherein a surface roughness Ra of a region of the aluminum plate where the partial coating layer is not formed is 0.03 to 0.5 μm.

[4] The positive tab lead as recited in any one of the aforementioned Items 1 to 3, wherein the partial coating layer is formed on an entire region of the aluminum plate to be exposed to the outside of the outer cover.

[5] The positive tab lead as recited in any one of the aforementioned Items 1 to 4, wherein a chitosan layer containing one or more compounds selected from a group consisting of chitosan and chitosan derivatives is further formed on a surface of the partial coating layer and the aluminum plate.

[6] A negative tab lead characterized in that a nickel coating layer is formed on an entire surface of a copper plate.

[7] A negative tab lead characterized in that a nickel coating layer is formed on an entire surface of a copper plate, and a partial coating layer made of tin or solder is formed on at least a part of a region of an outer surface of the nickel coating layer to be exposed to an outside of an outer cover.

[8] The negative tab lead as recited in the aforementioned Item 6 or 7, wherein a surface roughness Ra of the nickel coating layer is 0.03 to 0.5 μm.

[9] The negative tab lead as recited in any one of the aforementioned Items 6 to 8, wherein a chitosan layer containing one or more compounds selected from a group consisting of chitosan and chitosan derivatives is further formed on a surface of the nickel coating layer and/or the partial coating layer.

[10] A battery comprising a battery main body including a positive electrode, a negative electrode, and electrolyte, an outer cover enclosing the battery main body therein, a positive tab lead electrically connected to the positive electrode, and a negative tab lead electrically connected to the negative electrode, wherein a part of the positive tab lead is exposed to an outside of the outer cover, and a part of the negative tab lead is exposed to the outside, characterized in that the positive tab lead includes an aluminum plate and a partial coating layer made of nickel, tin or solder formed on at least a part of a region of the aluminum plate exposed to the outside, and the negative tab lead includes a copper plate and a nickel coating layer formed on an entire surface of the copper plate.

[11] A battery comprising a battery main body including a positive electrode, a negative electrode, and electrolyte, an outer cover enclosing the battery main body therein, a positive tab lead electrically connected to the positive electrode, and a negative tab lead electrically connected to the negative electrode, wherein a part of the positive tab lead is exposed to an outside of the outer cover, and a part of the negative tab lead is exposed to the outside, characterized in that the positive tab lead includes an aluminum plate and a partial coating layer made of nickel formed on at least a part of a region of the aluminum plate exposed to the outside, and the negative tab lead includes a copper plate and a nickel coating layer formed on an entire surface of the copper plate.

[12] A battery comprising a battery main body including a positive electrode, a negative electrode, and electrolyte, an outer cover enclosing the battery main body therein, a positive tab lead electrically connected to the positive electrode, and a negative tab lead electrically connected to the negative electrode, wherein a part of the positive tab lead is exposed to an outside of the outer cover, and a part of the negative tab lead is exposed to the outside, characterized in that the positive tab lead includes an aluminum plate and a partial coating layer made of tin formed on at least a part of a region of the aluminum plate exposed to the outside, and the negative tab lead includes a copper plate, a nickel coating layer formed on an entire surface of the copper plate, and a partial coating layer made of tin formed on at least a part of an region of the nickel coating layer exposed to the outside.

[13] A battery comprising a battery main body including a positive electrode, a negative electrode, and electrolyte, an outer cover enclosing the battery main body therein, a positive tab lead electrically connected to the positive electrode, and a negative tab lead electrically connected to the negative electrode, wherein a part of the positive tab lead is exposed to an outside of the outer cover, and a part of the negative tab lead is exposed to the outside, characterized in that the positive tab lead includes an aluminum plate and a partial coating layer made of solder formed on at least a part of a region of the aluminum plate exposed to the outside, and the negative tab lead includes a copper plate, a nickel coating layer formed on an entire surface of the copper plate, and a partial coating layer made of solder formed on at least a part of a region of the nickel coating layer exposed to the outside.

[14] The battery as recited in any one of the aforementioned Items 10 to 13, wherein the partial coating layer is formed on an entire region of the aluminum plate of the positive electrode exposed to the outside.

Effects of the Invention

According to the invention [1] (positive tab lead), a partial coating layer made of nickel, tin or solder is formed on at least a part of a region of an aluminum plate to be exposed to an outside of an outer cover. Therefore, it is possible to connect tab leads with each other by soldering. Furthermore, since tab leads can be connected by soldering, the energy cost for the connection can be kept low, which is economically beneficial.

According to the invention [2], since a surface roughness Ra of the aluminum plate is set to 0.03 to 0.5 $\mu$m, the adhesiveness between the positive tab lead and an insulating tab film can be increased, which can improve the battery endurance reliability.

According to the invention [3], since a surface roughness Ra of a region of the aluminum plate where the partial coating layer is not formed is set to 0.03 to 0.5 $\mu$m, the adhesiveness between the positive tab lead and an insulating tab film can be increased, which can improve the battery endurance reliability.

According to the invention [4], since the partial coating layer is formed on an entire region (excluding the side edge face) of the aluminum plate to be exposed to the outside of the outer cover, the corrosion resistance of the externally exposed region can be enhanced, which in turn can further improve the battery endurance reliability. It should be noted that the side edge face 11a of the region of the aluminum plate to be exposed to the outside of the outer cover can be covered by the partial coating layer 13 (see FIG. 9) but is not always required to be covered by the partial coating layer 13 (see FIG. 8). The invention [4] covers both of these structures.

According to the invention [5], since a chitosan layer containing one or more compounds selected from a group consisting of chitosan and chitosan derivatives is further formed on a surface of the partial coating layer and the aluminum plate, the adhesiveness between the positive tab lead and an insulating tab film can be further improved, which in turn can further improve the battery endurance reliability.

According to the invention [6] (negative tab lead), since a nickel coating layer is formed on an entire surface (excluding the side edge face) of a copper plate, tab leads can be connected with each other by soldering with sufficient connection strength. Furthermore, the connection of tab leads can be performed by soldering, reducing the energy cost for the connection, which is economically beneficial. It should be noted that the side edge face of the copper plate can be covered by the nickel coating layer 22 but is not always required to be covered by the nickel coating layer 22 (see FIG. 5). The invention [6] covers both of these structures.

According to the invention [7] (negative tab lead), since a nickel coating layer is formed on an entire surface of a copper plate and a partial coating layer made of tin or solder is formed on at least a part of a region of an outer surface of the nickel coating layer to be exposed to an outside of an outer cover, tab leads can be connected with each other by soldering with a sufficient connection strength. Furthermore, the connection of tab leads can be performed by soldering, reducing the energy cost for the connection, which is economically beneficial. It should be noted that the side edge face of the copper plate can be covered by the nickel coating layer 22 but is not always required to be covered by the nickel coating layer 22 (see FIG. 7). The invention [7] covers both of these structures.

According to the invention [8], since a surface roughness Ra of the nickel coating layer is set to 0.03 to 0.5 $\mu$m, the adhesiveness between the negative tab lead and an insulating tab film can be improved, which in turn can improve the battery endurance reliability.

According to the invention [9], since a chitosan layer containing one or more compounds selected from a group consisting of chitosan and chitosan derivatives is further formed on the nickel coating layer and/or the partial coating layer, the adhesiveness between the negative tab lead and an insulating tab film can be further improved, which in turn can further improve the battery endurance reliability.

According to the invention [10], it is constituted that the positive tab lead includes an aluminum plate and a partial coating layer made of nickel, tin or solder formed on at least a part of a region of the aluminum plate exposed to the outside and the negative tab lead includes a copper plate and a nickel coating layer formed on an entire surface (excluding the side edge face) of the copper plate. Therefore, in the case of forming an assembled battery by electrically connecting battery cells structured mentioned above, for example, the partial coating layer of the positive tab lead of a battery cell and the nickel coating layer of the negative tab lead of another battery cell can be connected with a sufficient connecting strength by soldering. Furthermore, since tab leads can be connected with each other by soldering, the energy cost for the connection can be kept low, which is economically beneficial. It should be noted that the side edge face of the copper plate can be covered by the nickel coating layer 22 (see FIG. 5) but is not always required to be covered by the nickel coating layer 22. The invention [10] covers both of these structures.

According to the invention [11], it is constituted such that the positive tab lead includes an aluminum plate and a partial coating layer made of tin formed on at least a part of a region of the aluminum plate exposed to the outside, and the negative tab lead includes a copper plate, a nickel coating layer formed on an entire surface (excluding the side edge face) of the copper plate, and a partial coating layer made of tin formed on at least a part of a region of the nickel coating layer exposed to the outside. Therefore, in the case of forming an assembled battery by electrically connecting battery cells structured mentioned above, for example, the partial coating layer of the positive tab lead of a battery cell and the nickel coating layer of the negative tab lead of another battery cell can be connected with a sufficient connection strength by soldering.

Furthermore, since tab leads can be connected with each other by soldering, the energy cost for the connection can be kept low, which is economically beneficial. In this structure [11], since the partial coating layer of the positive tab lead and the nickel coating layer of the negative tab lead are made of the same kind of metal (nickel), there is an advantage that the cost for forming these layers can be reduced. It should be noted that the side edge face of the copper plate can be covered by the nickel coating layer 22 (see FIG. 7) but is not always required to be covered by the nickel coating layer 22. The invention [11] covers both of these structures.

According to the invention [12], it is constituted such that the positive tab lead includes an aluminum plate and a partial coating layer made of nickel formed on at least a part of a region of the aluminum plate exposed to the outside, and the negative tab lead includes a copper plate and a nickel coating layer formed on an entire surface (excluding the side edge face) of the copper plate. Therefore, in the case of forming an assembled battery by electrically connecting battery cells structured mentioned above, for example, the partial coating layer of the positive tab lead of a battery cell and the partial coating layer of the negative tab lead of another battery cell can be connected with a sufficient connection strength by soldering. Furthermore, since tab leads can be connected with each other by soldering, the energy cost for the connection can be kept low, which is economically beneficial. It should be noted that the side edge face of the copper plate can be covered by the nickel coating layer 22 (see FIG. 7) but is not always required to be covered by the nickel coating layer 22. The invention [12] covers both of these structures.

According to the invention [13], it is constituted such that the positive tab lead includes an aluminum plate and a partial coating layer made of solder formed on at least a part of a region of the aluminum plate exposed to the outside and the negative tab lead includes a copper plate, a nickel coating layer formed on an entire surface (excluding the side edge face) of the copper plate, and a partial coating layer made of solder formed on at least a part of a region of the nickel coating layer exposed to the outside. Therefore, in the case of forming an assembled battery by electrically connecting battery cells structured mentioned above, for example, the partial coating layer of the positive tab lead of a battery cell and the partial coating layer of the negative tab lead of another battery cell can be connected with a sufficient connection strength by soldering. Furthermore, since tab leads can be connected with each other by soldering, the energy cost for the connection can be kept low, which is economically beneficial. It should be noted that the side edge face of the copper plate can be covered by the nickel coating layer 22 (see FIG. 7) but is not always required to be covered by the nickel coating layer 22. The invention [13] covers both of these structures.

According to the invention [14], since the partial coating layer is formed on an entire region (excluding the side edge face) of the aluminum plate of the positive electrode exposed to the outside, the corrosion resistance of the externally exposed region can be enhanced, which in turn can further improve the battery endurance reliability. It should be noted that the side edge face 11*a* of the region of the aluminum plate to be exposed to the outside of the outer cover can be covered by the partial coating layer 13 (see FIG. 9) but is not always required to be covered by the partial coating layer 13 (see FIG. 8). The invention [14] covers both of these structures.

BRIEF DESCRIPTION OF THE DRAWINGS

FIG. 1(*a*) is a perspective view showing an embodiment of a battery of the present invention, and FIG. 1(*b*) is an enlarged cross-sectional view taken along the line X-X in FIG. 1(*a*).

BEST MODE FOR CARRYING OUT THE INVENTION

Figure 1:
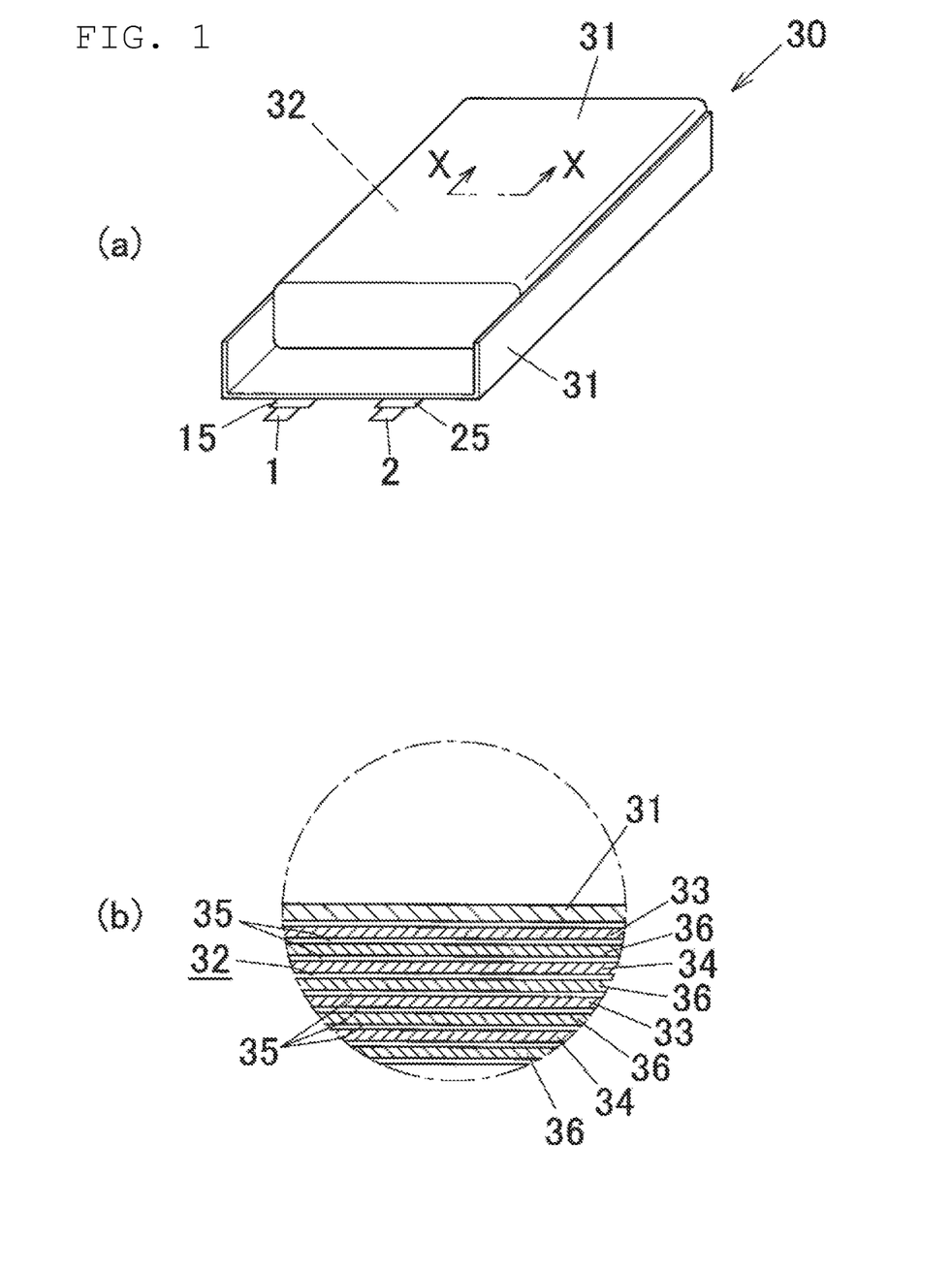

FIG. 1 shows a battery 30 according to an embodiment of the present invention. The battery 30 of this first embodiment is a nonaqueous electrolyte lithium secondary battery. In this battery 30, a film-like positive electrode 33 and a film-like negative electrode 34 are arranged one on the other via a separator 36 in a superimposed manner with a nonaqueous electrolyte 35 interposed between the positive electrode and the negative electrode so that electric charge/discharge can be performed by transmission of lithium ions. The battery main body 32 including the positive electrode 33, the negative electrode 34 and the electrolyte 35 is covered by an outer cover 31 in a liquid-tight manner. That is, the battery main body is sealed in the outer cover 31 (see FIG. 1).

Figure 2:
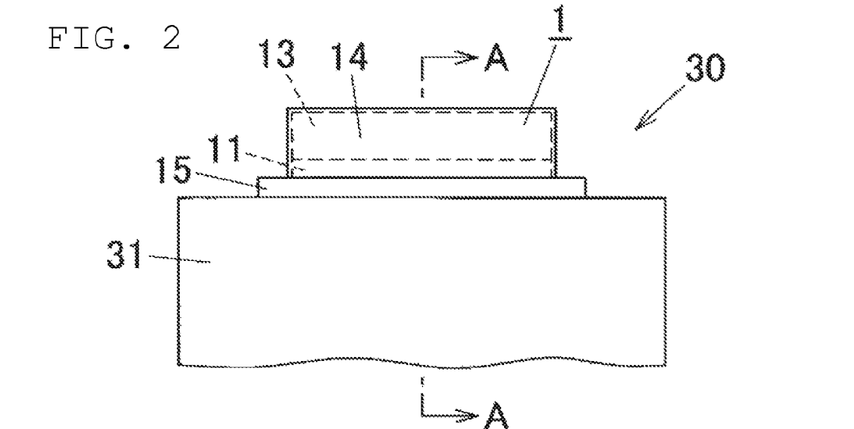
FIG. 2 is a plan view showing a positive tab lead and its vicinity of the battery according to the embodiment of the present invention.
Figure 3:
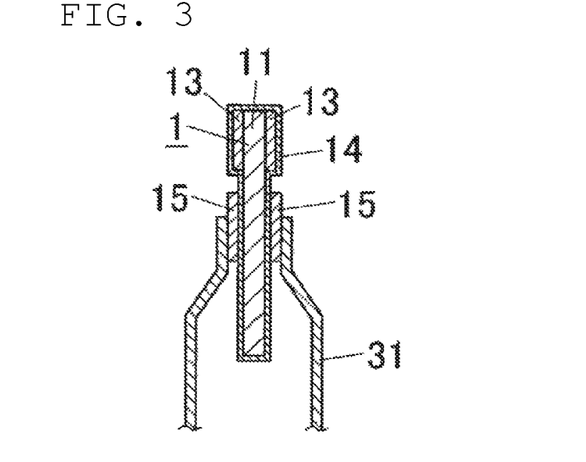
FIG. 3 is a cross-sectional view taken along the line A-A in FIG. 2.

A positive tab lead 1 is electrically connected to the positive electrode 33, and a part of the positive tab lead 1 is exposed (i.e., extended) to an outside of the outer cover 31 (see FIGS. 1 to 3). In this embodiment, as shown in FIG. 3, the positive tab lead 1 is a member in which a nickel partial coating layer 13 is formed on a part (tip end portion) of the externally exposed region of the aluminum plate 11 and a chitosan layer 14 containing chitosan is formed on an outermost surface. No nickel coating layer is formed on the region of the aluminum plate 11 to be arranged in the outer cover 31.

As shown in FIG. 3, insulating tab films 15 and 15 are adhered to both sides of the longitudinally intermediate region of the positive tab lead 1, and the edge portion of the outer cover 31 is arranged such that the edge portion pinches the insulating tab films 15 and 15. The edge portion of the outer cover 31 is sealed by, e.g., heat-sealing.

Figure 4:
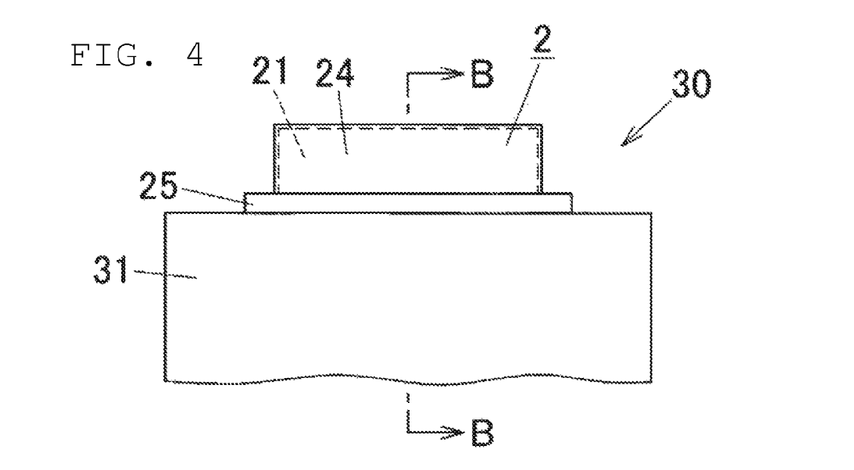
FIG. 4 is a plan view showing a negative tab lead and its vicinity of the battery according to the embodiment of the present invention.
Figure 5:
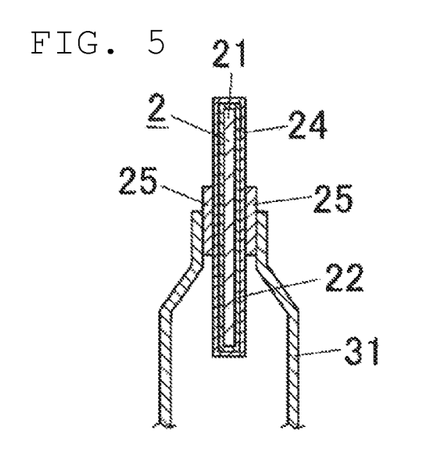
FIG. 5 is a cross-sectional view taken along the line B-B in FIG. 4.

A negative tab lead 2 is electrically connected to the negative electrode 34, and a part of the negative tab lead 2 is exposed (i.e., extended) to an outside of the outer cover 31 (see FIGS. 1, 4 and 5). In this embodiment, as shown in FIG. 5, the negative tab lead 2 is a member in which a nickel coating layer 22 is formed on an entire surface of the copper plate 21 and a chitosan layer 24 containing chitosan is formed on an entire outermost surface of the nickel coating layer 22.

As shown in FIG. 5, insulating tab films 25 and 25 are adhered to both sides of the longitudinally intermediate region of the negative tab lead 2, and the edge portion of the outer cover 31 is arranged such that the edge portion pinches the insulating tab films 25 and 25. The edge portion of the outer cover 31 is sealed by, e.g., heat-sealing.

In forming an assembled battery by electrically connecting the batteries, or unit cells 30, by soldering, for example, a partial coating layer 13 of a positive tab lead 1 of one unit cell 30 and a nickel coating layer 22 of a negative tab lead 2 of another unit cell 30, sufficient connection strength can be attained.

Figure 6:
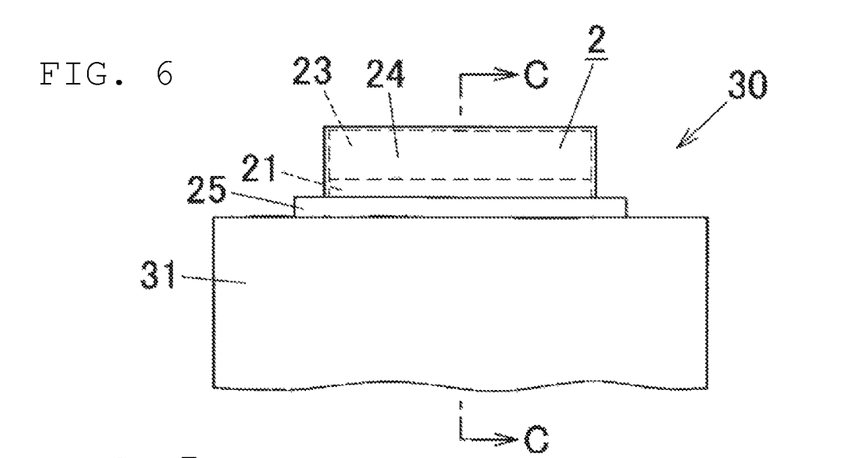
FIG. 6 is a plan view showing a negative tab lead and its vicinity of a battery according to another embodiment of the present invention.
Figure 7:
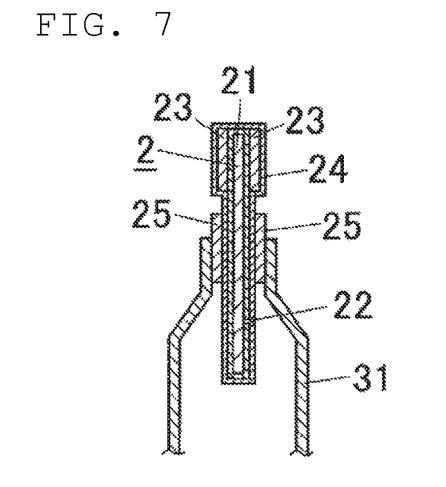
FIG. 7 is a cross-sectional view taken along the line C-C in FIG. 6.

As a battery cell 30 of the present invention, the following structure (second embodiment) can be employed. That is, it is acceptable to employ a structure that, in the battery of the aforementioned embodiment, as the positive tab lead 1, a tin partial coating layer 13 is formed on a part (tip end portion) of the externally exposed region of the aluminum plate 11 and a chitosan layer 14 containing chitosan is formed on an outermost surface (see FIG. 3), while as the negative tab lead 2, as shown in FIGS. 6 and 7, a nickel coating layer 22 is formed on the entire surface of the cupper plate 21, a tin partial coating layer 23 is formed on a part of the externally exposed region of the nickel coating layer 22, and a chitosan layer 24 containing chitosan is formed on the outermost surface. No tin coating layer is formed on the region of the aluminum plate 11 to be arranged in the outer cover 31.

As shown in FIG. 3, insulating tab films 15 and 15 are adhered to both sides of the longitudinally intermediate region of the positive tab lead 1, and the edge portion of the outer cover 31 is arranged such that the edge portion pinches the insulating tab films 15 and 15. The edge portion of the outer cover 31 is sealed by, e.g., heat-sealing.

As shown in FIG. 7, insulating tab films 25 and 25 are adhered to both sides of the longitudinally intermediate region of the negative tab lead 2, and the edge portion of the outer cover 31 is arranged such that the edge portion pinches the insulating tab films 25 and 25. The edge portion of the outer cover 31 is sealed by, e.g., heat-sealing.

In the case of forming an assembled battery by electrically connecting batteries or unit cells 30 of the aforementioned embodiment, for example, by soldering the tin partial coating layer 13 of the positive tab lead 1 of one unit cell 30 and a tin partial coating layer 23 of a negative tab lead 2 of another unit cell 30, sufficient connection strength can be attained.

As a battery 30 of this invention, the following structure (third embodiment) can be employed. That is, it is acceptable to employ a structure that, in the battery of the aforementioned second embodiment, as the positive tab lead 1, a solder partial coating layer 13 is formed on a part (tip end portion) of the externally exposed region of the aluminum plate 11 and a chitosan layer 14 containing chitosan is formed on an outermost surface (see FIG. 3), while as the negative tab lead 2, as shown in FIGS. 6 and 7, a nickel coating layer 22 is formed on the entire surface of the cupper plate 21, a solder partial coating layer 23 is formed on a part of the externally exposed region of the nickel coating layer 22, and a chitosan layer 24 containing chitosan is formed on the outermost surface. No solder coating layer is formed on the region of the aluminum plate 11 to be arranged in the outer cover 31.

As shown in FIG. 3, the insulating tab films 15 and are adhered to both sides of the longitudinally intermediate region of the positive tab lead 1, and the edge portion of the outer cover 31 is arranged such that the edge portion pinches the insulating tab films 15 and 15. The edge portion of the outer cover 31 is sealed by, e.g., heat-sealing.

As shown in FIG. 7, the insulating tab films 25 and are adhered to both sides of the longitudinally intermediate region of the negative tab lead 2, and the edge portion of the outer cover 31 is arranged such that the edge portion pinches the insulating tab films 25 and 25. The edge portion of the outer cover 31 is sealed by, e.g., heat-sealing.

In the case of forming an assembled battery by electrically connecting batteries, or unit cells 30 of the aforementioned third embodiment, for example, by soldering the solder partial coating layer 13 of the positive tab lead 1 of one battery 30 and a solder partial coating layer 23 of a negative tab lead 2 of another battery 30, sufficient connection strength can be attained.

In the aforementioned first to third embodiments, a structure that the partial coating layer 13 is formed on a part of the region of the aluminum plate 11 to be exposed to an outside of the outer cover 31 is employed. The present invention is not limited to such structure, and allows to employ a structure that the partial coating layer 13 is formed on the entire region (excluding the side edge face 11a) of the aluminum plate 11 to be exposed to an outside of the outer cover 31, and also allows to employ a structure that the partial coating layer 13 is formed on the entire region (including the side edge face 11a) of the aluminum plate 11 to be exposed to an outside of the outer cover 31. Employment of such structure has an advantage that the corrosion resistance of the externally exposed region can be enhanced.

Figure 8:
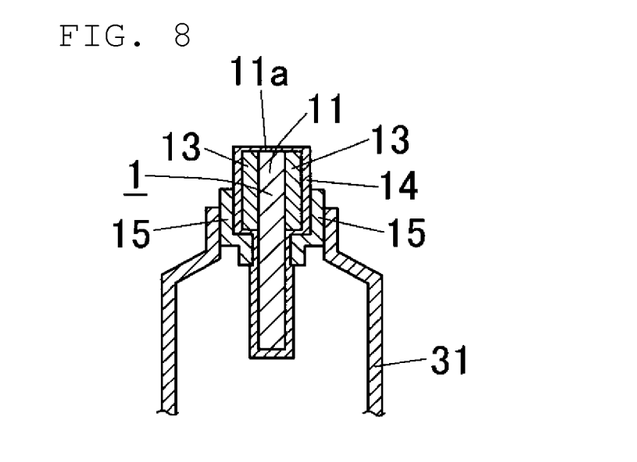
FIG. 8 is a plan view showing a positive tab lead and its vicinity of a battery according to still another embodiment of the present invention.

An example of the former modification is shown in FIG. 8. In this embodiment, as shown in FIG. 8, this positive tab lead 1 is constituted such that a nickel partial coating layer 13 is formed on the entire externally exposed region (excluding the side edge portion 11a) of the aluminum plate 11 and a chitosan layer 13 containing chitosan is formed on the outermost surface. In detail, in this embodiment, insulating tab films 15 and 15 made of polypropylene resin are thermally welded on both sides of the longitudinally intermediate region of the positive electrode tab lead 1 such that the insulating tab films cover the region where the partial coating layer 13 is formed. Furthermore, the edge portion of the outer cover 31 is arranged such that the edge portion pinches the insulating tab films 15 and 15, and the edge portion of this outer cover 31 is sealed by, e.g., heat-sealing. No nickel coating layer is formed on the region of the aluminum plate 11 to be arranged in the outer cover 31.

Figure 9:
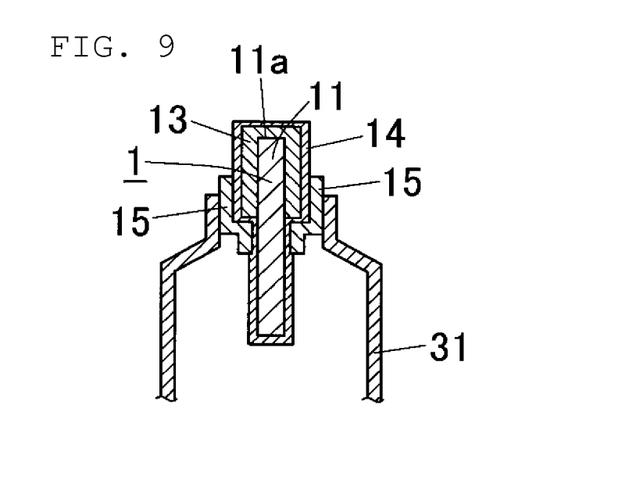
FIG. 9 is a plan view showing a positive tab lead and its vicinity of a battery according to still yet another embodiment of the present invention.

An example of the latter modification is shown in FIG. 9. In this embodiment, a nickel partial coating layer is formed on the entire externally exposed region (including the side end face 11a) of the aluminum plate 11 of the positive tab lead 1. The other structure is the same as the structure shown in FIG. 8.

In this invention, as a method of forming the partial coating layers 13 and 23, although not specifically limited, a clad rolling method, an immersion plating method, an electroplating method, an evaporation method, a CVD (chemical vapor deposition) method, and a PVD (physical vapor deposition) method, can be exemplified. Among other things, it is preferable to use an immersion plating method or an electroplating method from a viewpoint of productivity and cost. The thickness of the partial coating layer 13 and 23 is preferably set to 1 to 10 μm.

As a method of forming the nickel coating layer 22, although not specifically limited, a clad rolling method, an immersion plating method, an electroplating method, an evaporation method, a CVD (chemical vapor deposition) method, and a PVD (physical vapor deposition) method, can be exemplified. Among other things, it is preferable to use an immersion plating method or an electroplating method from a viewpoint of productivity and cost. The thickness of the nickel coating layer 22 is preferably set to 1 to 10 μm.

The surface roughness Ra of the aluminum plate 11 is preferably set so as to fall within the range of 0.03 to 0.5 μm.

Setting the surface roughness within this range can improve the adhesiveness between the positive tab lead 1 and the insulating tab film 15. The surface roughness falling within this range can be formed by, for example, an emboss rolling method, a hair-line processing method, a shot blasting method, or a chemical etching method.

The surface roughness Ra of the nickel coating layer 22 formed on the copper plate 21 is preferably set so as to fall within the range of 0.03 to 0.5 μm. Setting the surface roughness within this range can improve the adhesiveness between the negative tab lead 2 and the insulating tab film 25. The surface roughness falling within this range can be formed by, for example, an emboss rolling method, a hair-line processing method, a shot blasting method, or a chemical etching method.

The surface roughness Ra is a value measured in accordance with JIS B0601-2001.

The thickness of the aluminum plate 11 is preferably set to 0.1 to 1 mm, and the thickness of the copper plate 21 is preferably set to 0.1 to 1 mm.

As the chitosan forming the chitosan layer 14 and 24, one or more compounds selected from the group consisting chitosan and chitosan derivatives is used. As the chitosan derivatives, although not specifically limited, for example, carboxymethylchitosan, cationized chitosan, hydroxyalkylchitosan, glycerylchitosan, and salt of chitosan acid, can be exemplified.

In this invention, as a method of forming the chitosan layer 14, 24, although not specifically limited, a method in which processing liquid containing chitosan is applied to the surface by a coating method, such as, e.g., a dipping method, a roll coating method, or a gravure coating method and dried can be exemplified. It is preferable that the solid content application quantity of the chitosan layer 14, 24 is set to 0.1 to 50 mg/m$^2$.

In this invention, as the positive electrode 33, although not specifically limited, any positive electrode material known for use in a nonaqueous electrolyte battery can be exemplified. Concretely, for example, a positive electrode formed by applying a mixed composition in which lithium salt (LiCoO$_2$, LiNiO$_2$, LiMnO$_2$, LiFeO$_2$) as a positive electrode active material, a carbon powder as a conductive agent, and PVDF as a binding agent, are mixed, on the surface of the aluminum plate as a positive electrode collector and drying it can be exemplified. As the carbon powder, although not specifically limited, for example, powder graphite, granular graphite, fullerene graphite, and carbon nano-tube, can be exemplified.

Furthermore, as the negative electrode 34, although not specifically limited, for example, any negative electrode material known for use in a nonaqueous electrolyte battery can be used. Specifically, for example, a negative electrode formed by applying a mixed composition in which a carbon powder as a negative electrode active agent, and PVDF as a binding agent are mixed on the surface of the copper plate as a negative electrode collector and drying it can be exemplified.

As the electrolyte 35, although not specifically limited, for example, any nonaqueous electrolyte known for use in a nonaqueous electrolyte battery can be used. As this nonaqueous electrolyte, a gel nonaqueous electrolyte containing nonaqueous solvent and electrolyte is preferably used. As the nonaqueous solvent, although not specifically limited, for example, ethylene carbonate and propylene carbonate can be exemplified. As the electrolyte, although not specifically limited, for example, LiPF$_6$, and LiClO$_4$ can be exemplified.

As the separator 36, although not specifically limited, any separators known for use in a nonaqueous electrolyte battery can be exemplified. Concretely, porous polypropylene can be exemplified.

As the outer cover 31, although not specifically limited, an outer cover which is a laminate member in which a polymer film of, e.g., polyethylene, polypropylene, polyester or polyamide is arranged on the surface of a metal foil of, e.g., aluminum can be exemplified.

As the insulating tab film 15, 25, although not specifically limited, an insulating film made of polyethylene or polypropylene can be exemplified.

EXAMPLES

Next, concrete examples according to the present invention will be explained. It should be noted that the present invention is not limited to these examples.

Example 1

A positive tab lead 1 was obtained by forming a nickel partial coating layer (partial plated layer) 13 having a thickness of 3 μm on each of both sides of the tip end portion of an aluminum plate 11 which was 0.1 μm in surface roughness Ra and 500 μm in thickness by an electroplating method. A negative tab lead 2 was obtained by forming a nickel plated coating layer 22 having a thickness of 3 μm on the entire surface of a copper plate 21 which was 0.1 μm in surface roughness Ra and 500 μm in thickness by an electroplating method.

Next, the partial coating layer 13 of the positive tab lead and the nickel plated coating layer 22 were connected by soldering. The electric energy required for the soldering was 0.1 kWs.

Example 2

A positive tab lead 1 was obtained by forming a tin partial coating layer (partial plated layer) 13 having a thickness of 3 μm on each of both sides of the tip end portion of an aluminum plate 11 which was 0.1 μm in surface roughness Ra and 500 μm in thickness by an electroplating method. A negative tab lead 2 was obtained by forming a nickel plated coating layer 22 having a thickness of 3 μm on the entire surface of a copper plate 21 which was 0.1 μm in surface roughness Ra and 500 μm in thickness by an electroplating method and further forming a tin partial coating layer (partial plated layer) 23 having a thickness of μm on both sides of the tip end portion of the nickel plated coating layer 22 by an electroplating method.

Next, the tin partial coating layer 13 of the positive tab lead and the tin partial coating layer 23 of the negative tab lead 2 were connected by soldering. The electric energy required for the soldering was 0.1 kWs.

Example 3

A positive tab lead 1 was obtained by forming a solder partial coating layer (partial plated layer) 13 having a thickness of 3 μm on each of both sides of the tip end portion of an aluminum plate 11 which was 0.1 μm in surface roughness Ra and 500 μm in thickness by an electroplating method. A negative tab lead 2 was obtained by forming a nickel plated coating layer 22 having a thickness of 3 μm on the entire surface of a copper plate 21 which was 0.1 μm in surface roughness Ra and 500 μm in thickness by an electroplating method and further forming a solder coating layer (partial plated layer) 23 having a thickness of 3 µm on both sides of a tip end portion of the nickel plated coating layer 22.

Next, the solder partial coating layer 13 of the positive tab lead and the solder partial coating layer 23 of the negative tab lead 2 were connected by soldering. The electric energy required for the soldering was 0.1 kWs.

Comparative Example 1

A positive tab lead of an aluminum plate which was 0.1 µm in surface roughness Ra and 500 µm in thickness was prepared, and a negative tab lead was obtained by forming a nickel plated coating layer having a thickness of 3 µm on the entire surface of a copper plate which was 0.1 µm in surface roughness Ra and 500 µm in thickness by an electroplating method.

Next, the positive tab lead and the nickel plated coating layer of the negative tab lead were connected by a welding method. The electric energy required for the welding was 10 kWs.

The strength of connection between the positive tab lead and the negative tab lead connected with each other as mentioned above was evaluated in accordance with the following evaluation method.

<Connection Strength Evaluation Method>

The strength of connection between the tab leads was measured by subjecting the mutually connected positive tab lead and negative tab lead to a tensile test. The connection strength of 60 MPa or more was denoted as "○," and the connection strength less than 60 MP was denoted as "X."

As apparent from Table 1, according to the positive tab lead and the negative tab lead of the present invention, it was confirmed that the tab leads (the positive tab lead and the negative tab lead) were connected with a sufficient connection strength at low energy cost.

On the other hand, in Comparative Example 1 in which tab leads were connected by welding, the energy cost was extremely large.

Example 5

A positive tab lead 1 was obtained in the same manner as in Example 4 except that the solid content adhered quantity of the chitosan layer 14 was set to 0.5 mg/m$^2$ (see FIG. 3).

Example 6

A positive tab lead 1 was obtained in the same manner as in Example 4 except that an aluminum plate 11 having a surface roughness Ra of 0.1 µm and the solid content adhered quantity of the chitosan layer 14 was set to 1.0 mg/m$^2$ (see FIG. 3).

Example 7

A positive tab lead 1 was obtained by forming a tin plated coating layer (partial plated layer) 13 having a thickness of 3 µm on both sides of the tip end portion of an aluminum plate 11 which was 0.1 µm in surface roughness Ra and 500 µm in thickness by an electroplating method and further forming a chitosan layer 14 which was 1.0 mg/m$^2$ in solid content adhered quantity by applying carboxymethyl chitosan aqueous solution (concentration: 0.5 mass) on the entire surface of the aluminum plate and the tin partial coating layer and then drying it (see FIG. 3).

Example 8

A positive tab lead 1 was obtained by forming a solder partial coating layer (partial plated layer) 13 having a thickness of 3 µm on both sides of the tip end portion of an aluminum plate 11 which was 0.1 µm in surface roughness Ra and 500 µm in thickness by an electroplating method and further forming a chitosan layer 14 which was 1.0 mg/m$^2$ in solid content adhered quantity by applying carboxymethyl chitosan aqueous solution (concentration: 0.5 mass) on the entire surface of the aluminum plate and the solder partial coating layer and then drying it (see FIG. 3).

TABLE 1

|  | Positive tab lead | Negative tab lead | Method of connection | Electric energy required for connection(kWs) | Connection state |
| --- | --- | --- | --- | --- | --- |
| Comp. Example 1 | Aluminum plate | Copper plate/Ni plating | Welding | 10 | ○ |
| Example 1 | Aluminum plate/ Ni partial plating | Copper plate/Ni plating | Soldering | 0.1 | ○ |
| Example 2 | Aluminum plate/ Sn partial plating | Copper plate/Ni plating/ Sn partial plating | Soldering | 0.1 | ○ |
| Example 3 | Aluminum plate/ solder partial plating | Copper plate/Ni plating/ Solder partial plating | Soldering | 0.1 | ○ |

Example 4

A positive tab lead 1 was obtained by forming a nickel partial coating layer (partial plated layer) 13 having a thickness of 3 µm on both sides of the tip end portion of an aluminum plate 11 which was 0.03 µm in surface roughness Ra and 500 µm in thickness by an electroplating method and further forming a chitosan layer 14 which was 50 mg/m$^2$ in solid content adhered quantity by applying carboxymethyl chitosan aqueous solution (concentration: 0.5 mass %) on the entire surface of the aluminum plate and the nickel partial coating layer and then drying it (see FIG. 3).

Comparative Example 2

A positive tab lead made of an aluminum plate which was 0.03 µm in surface roughness Ra and 500 µm in thickness was prepared.

Leakage of the liquid (electrolytic solution) from the positive tab portion of the battery having the positive tab lead obtained as mentioned above was evaluated in accordance with the following evaluation method.

<Evaluation Method of Liquid Leakage from the Positive Tab Portion>

As shown in FIG. 3, insulating tab films 15 and 15 made of polypropylene resin were thermally welded on both sides of the longitudinally intermediate region of the positive tab lead 1, and the edge portion of an outer cover 31 having a non-stretched polypropylene layer on the inner surface side was sealed by heat sealing in such a manner that the edge portion pinched the insulating tab films 15 and 15. Immediately before the sealing, electrolyte solution (LiPF$_6$ having a concentration of 1M) was sealed in the outer cover 31. This sample piece was subjected to a durability test in an oven of 85° C. for 30 days. 1,000 samples were prepared every Example, and subjected to a durability test. The number of samples which caused leakage of electrolytic solution from the positive tab portion (i.e., the number of samples which caused defects) was counted.

method, and further forming a chitosan layer 24 which was 1.0 mg/m$^2$ in solid content adhered quantity by applying carboxymethyl chitosan aqueous solution (concentration: 0.5 mass %) on the entire surface of the nickel coating layer and the partial plated layer and then drying it (see FIG. 7).

Example 13

A negative tab lead 2 was obtained by forming a nickel coating layer 22 which was 0.1 μm in surface roughness Ra

TABLE 2

| | | Positive tab lead | | Evaluation of leakage |
|---|---|---|---|---|
| | Structure | Surface roughness of aluminum plate Ra (μm) | Chitosan solid content application quantity (mg/m$^2$) | (number of samples caused leak defective among 1,000 samples) |
| Comp. Example 2 | Aluminum plate | 0.03 | 0 | 52 |
| Example 4 | Aluminum plate/Ni partial plating/chitosan layer | 0.03 | 50 | 0 |
| Example 5 | Aluminum plate/Ni partial plating/chitosan layer | 0.03 | 0.5 | 1 |
| Example 6 | Aluminum plate/Ni partial plating/chitosan layer | 0.1 | 1.0 | 0 |
| Example 7 | Aluminum plate/Sn partial plating/chitosan layer | 0.1 | 1.0 | 0 |
| Example 8 | Aluminum plate/Solder partial plating/chitosan layer | 0.1 | 1.0 | 0 |

Example 9

A negative tab lead 2 was obtained by forming a nickel coating layer 22 which was 0.1 μm in surface roughness Ra and 3 μm in thickness on the entire surface of the copper plate 21 having a thickness of 500 μm.

Example 10

A negative tab lead 2 was obtained by forming a nickel coating layer 22 which was 0.02 μm in surface roughness Ra and 3 μm in thickness on the entire surface of a copper plate 21 having a thickness of 500 μm by an electroplating method, and further forming a chitosan layer 24 which was 1.0 mg/m$^2$ in solid content adhered quantity by applying carboxymethyl chitosan aqueous solution (concentration: 0.5 mass %) on the outer surface of the nickel coating layer 22 and then drying it (see FIG. 5).

Example 11

A negative tab lead 2 was obtained in the same manner as in Example 10 except that a nickel coating layer 22 having a surface roughness Ra of 0.1 μm was formed (see FIG. 5).

Example 12

A negative tab lead 2 was obtained by forming a nickel coating layer 22 which was 0.1 μm in surface roughness Ra and 3 μm in thickness on the entire surface of a copper plate 21 having a thickness of 500 μm by an electroplating method, forming a tin partial coating layer (partial plated layer) 23 having a thickness of 3 μm on both sides of the tip portion of the nickel plated coating layer 22 by an electroplating method, and further forming a chitosan layer 24 which was 1.0 mg/m$^2$ in solid content adhered quantity by applying carboxymethyl chitosan aqueous solution (concentration: 0.5 mass %) on the entire surface of the nickel coating layer and the partial plated layer and then drying it (see FIG. 7).

and 3 μm in thickness on the entire surface of a copper plate 21 having a thickness of 500 μm by an electroplating method, forming a solder partial coating layer (partial plated layer) having a thickness of 3 μm on both sides of the tip portion of the nickel coating layer 22 by an electroplating method, and further forming a chitosan layer 24 which was 1.0 mg/m$^2$ in solid content adhered quantity by applying carboxymethyl chitosan aqueous solution (concentration: 0.5 mass %) on the entire surface of the nickel coating layer and the solder partial coating layer and then drying it (see FIG. 7).

Leakage of the liquid (electrolytic solution) from the negative tab portion of a battery having the negative tab lead obtained as mentioned above was evaluated in accordance with the following evaluation method.

<Evaluation Method of Liquid Leakage from the Negative Tab Portion>

As shown in FIGS. 5 and 7, insulating tab films 25 and 25 made of polypropylene resin were thermally welded on both sides of the longitudinally intermediate region of the negative tab lead 2, and the edge portion of an outer cover 31 having a non-stretched polypropylene layer on the inner surface side was sealed by heat sealing in such a manner that the edge portion pinched the insulating tab films 25 and 25. Immediately before the sealing, electrolyte solution (LiPF$_6$ having a concentration of 1M) was sealed in the outer cover 31. This product was subjected to a durability test in an oven of 85° C. for 30 days. 1,000 samples were prepared every Example, and subjected to, a durability test. The number of samples which caused leakage of electrolytic solution from the negative tab portion (i.e., the number of samples which caused defects) was counted.

TABLE 3

| | | Negative tab lead | | Evaluation of leakage |
|---|---|---|---|---|
| | Structure | Surface roughness of Ni plating layer Ra (μm) | Chitosan solid content application quantity (mg/m²) | (number samples caused leakage defective among 1,000 samples) |
| Example 9 | Copper plate/Ni plating | 0.1 | — | 1 |
| Example 10 | Copper plate/Ni plating/chitosan layer | 0.02 | 1.0 | 1 |
| Example 11 | Copper plate/Ni plating/chitosan layer | 0.1 | 1.0 | 0 |
| Example 12 | Copper plate/Ni plating/Sn partaial layer/chitosan layer | 0.1 | 1.0 | 0 |
| Example 13 | Copper plate/Ni plating/sloder partial layer/chitosan layer | 0.1 | 1.0 | 0 |

Example 14

A positive tab lead 1 was obtained by forming a nickel partial coating layer (partial plated layer) 13 having a thickness of 0.3 μm on both sides of the tip end portion of an aluminum plate 11 which was 0.1 μm in surface roughness Ra and 500 μm in thickness by an electroplating method and further forming a chitosan layer 14 which was 50 mg/m² in solid content adhered quantity by applying carboxymethyl chitosan aqueous solution (concentration: 0.5 mass %) on the entire surface of the aluminum plate and the partial coating layer and then drying it (see FIG. 8).

Next, insulating tab films 15 and 15 were thermally welded to both sides of the longitudinally intermediate region of the positive tab lead 1 in such a manner that the insulating tab films cover the region where the partial coating layer 13 was formed (see FIG. 8). That is, a positive tab lead 1 in which a nickel partial coating layer (partial plated layer) 13 was on the entire region (excluding the side edge face 11a) of the aluminum plate 11 to be disposed to an outside of the outer cover 31 was obtained (see FIG. 8).

Leakage of the liquid (electrolytic solution) from the positive tab portion of the battery having the positive tab lead of Example 14 obtained as mentioned above was evaluated in accordance with the following evaluation method. The results are shown in Table 4.

<Evaluation Method of Liquid Leakage from the Positive Tab Portion>

As shown in FIG. 8, the edge portion of the outer cover 31 having a non-stretched polypropylene layer on the inner surface side was sealed by heat sealing in such a manner that the edge portion pinched the insulating tab films 15 and 15. Immediately before the sealing, electrolyte solution ($LiPF_6$ having a concentration of 1M) was sealed in the outer cover 31. This sample was subjected to a durability test in an oven of 85° C. for 30 days. 1,000 samples were prepared every Example, and subjected to a durability test. The number of samples which caused leakage of electrolytic solution from the negative tab portion (i.e., the number of samples which caused defects) was counted.

TABLE 4

| | | Positive tab lead | | Evaluation of leakage |
|---|---|---|---|---|
| | Structure | Surface roughness of aluminum plate Ra (μm) | Chitosan solid content application quantity (mg/m²) | (number of samples caused leakage defects among 1,000 samples) |
| Example 14 | Aluminum plate/Ni partial plating/chitosan layer (Ni plating was performed on the entire surface (excluding the side edge face) of the region of the aluminum plate to be exposed to an outside of the outer cover) | 0.1 | 50 | 0 |

Example 15

A positive tab lead 1 was obtained by forming a nickel partial coating layer (partial plated layer) 13 having a thickness of 3 μm on both sides (both surfaces) of the tip end portion of an aluminum plate 11 which was 0.1 μm in surface roughness Ra and 500 μm in thickness by an electroplating method and further forming a chitosan layer 14 which was 50 mg/m² in solid content adhered quantity by applying carboxymethyl chitosan aqueous solution (concentration: 0.5 mass %) on the entire surface of the aluminum plate and the partial coating layer and then drying it (see FIG. 8).

Next, insulating tab films 15 and 15 of polypropylene resin were thermally welded to both sides of the longitudinally intermediate region of the positive tab lead 1 in such a manner that the insulating tab films cover the region where the partial coating layer 13 was formed (see FIG. 8). That is, a positive tab lead 1 in which a nickel partial coating layer (partial plated layer) 13 was on the entire region (excluding the side edge face) of the aluminum plate to be disposed to an outside of the outer cover was obtained (see FIG. 8).

Further, a negative tab lead 2 was obtained by forming a nickel plated coating layer 22 having a thickness of 3 μm on the entire surface of a copper plate 21 which was 0.1 μm in the surface roughness Ra and 500 μm in thickness, and further forming a chitosan layer 24 which was 50 mg/m² in solid content adhered quantity by applying carboxymethyl chitosan aqueous solution (concentration: 0.5 mass) on the outer surface of the nickel coating layer 22 and then drying it (see FIG. 5).

Next, the partial coating layer 13 of the positive tab lead and the nickel plated coating layer 22 were connected by soldering. The electric energy required for the soldering was 0.1 kWs.

Example 16

A positive tab lead 1 was obtained by forming a nickel partial coating layer (partial plated layer) 13 having a thickness of 3 μm on both sides of the tip end portion of an aluminum plate 11 by an electroplating method and further forming a chitosan layer 14 which was 50 mg/m² in solid content adhered quantity by applying carboxymethyl chitosan aqueous solution (concentration: 0.5 mass %) on the entire surface of the aluminum plate and the nickel partial coating layer and then drying it (see FIG. 3).

A negative tab lead 2 was obtained by forming a nickel plated coating layer 22 having a thickness of 3 μm on the entire surface of a copper plate 21 which was 0.1 μm in surface roughness Ra and 500 μm in thickness by an electroplating method, and further forming a chitosan layer 24 which was 50 mg/m² in solid content adhered quantity by applying carboxymethyl chitosan aqueous solution (concentration: 0.5 mass %) on the entire surface of the nickel coating layer and then drying it (see FIG. 5).

Next, the partial coating layer 13 of the positive tab lead and the nickel plated coating layer 22 of the negative tab lead 2 were connected by soldering. The electric energy required for the soldering was 0.1 kWs.

Example 17

A positive tab lead 1 was obtained by forming a tin plated coating layer (partial plated layer) 13 having a thickness of 3 μm on both sides of the tip end portion of an aluminum plate 11 which was 0.1 μm in surface roughness Ra and 500 μm in thickness by an electroplating method and further forming a chitosan layer 14 which was 50 mg/m² in solid content adhered quantity by applying carboxymethyl chitosan aqueous solution (concentration: 0.5 mass %) on the entire surface of the aluminum plate and the tin partial coating layer and then drying it (see FIG. 3).

Further, a negative tab lead 2 was obtained by forming a nickel plated coating layer 22 which having a thickness of 3 μm on the entire surface of a copper plate 21 which was 0.1 μm in surface roughness Ra and 500 μm in thickness by an electroplating method, forming a tin partial coating layer (partial plated layer) 23 having a thickness of 3 μm on both sides of the tip portion of the nickel plated coating layer 22 by an electroplating method, and further forming a chitosan layer 24 which was 50 mg/m² in solid content adhered quantity by applying carboxymethyl chitosan aqueous solution (concentration: 0.5 mass %) on the entire surface of the nickel coating layer and the tin partial coating layer and then drying it (see FIG. 7).

Next, the tin partial coating layer 13 of the positive tab lead and the tin partial coating layer 23 were connected by soldering. The electric energy required for the soldering was 0.1 kWs.

Example 18

A positive tab lead 1 was obtained by forming a solder partial coating layer (partial plated layer) 13 having a thickness of 3 μm on both sides of the tip end portion of an aluminum plate 11 which was 0.1 μm in surface roughness Ra and 500 μm in thickness by an electroplating method and further forming a chitosan layer 14 which was 50 mg/m² in solid content adhered quantity by applying carboxymethyl chitosan aqueous solution (concentration: 0.5 mass %) on the entire surface of the aluminum plate and the solder partial coating layer and then drying it (see FIG. 3).

Further, a negative tab lead 2 was obtained by forming a nickel plated coating layer 22 having a thickness of 3 μm on the entire surface of a copper plate 21 which was 0.1 μm in surface roughness Ra and 500 μm in thickness by an electroplating method, forming a solder partial coating layer (partial plated slayer) 23 having a thickness of 3 μm on both sides of the tip portion of the nickel plated coating layer 22 by an electroplating method, and further forming a chitosan layer 24 which was 50 mg/m² in solid content adhered quantity by applying carboxymethyl chitosan aqueous solution (concentration: 0.5 mass %) on the entire surface of the nickel coating layer and the solder partial coating layer and then drying it (see FIG. 7).

Next, the solder partial coating layer 13 of the positive tab lead and the solder partial coating layer 23 of the negative tab lead 2 were connected by soldering. The electric energy required for the soldering was 0.1 kWs.

The connection strength between the positive tab lead and the negative tab lead connected with each other as mentioned above in Examples 15 to 18 was evaluated in accordance with the aforementioned connection strength evaluation method, and the corrosion resistance of the positive tab lead and the negative tab lead connected with each other as mentioned above in Examples 15 to 18 and Comparative Example 1 was evaluated in accordance with the following evaluation method.

<Corrosion Resistance Evaluation Method>

The positive tab lead and the negative tab lead connected with each other were set in a salt spray testing device (Temperature: 35° C.) and the device was operated for 500 hours in this state. Thereafter, the positive tab lead and the negative tab lead were taken out and visually inspected in degree of corrosion. The corrosion was evaluated in accordance with the following criterion.

(Criterion)

"⊚" denotes that no corrosion traces of the aluminum plate was found; the corrosion resistance was excellent "○" denotes that slight corrosion traces of the aluminum plate was found but the aluminum plate was generally in good condition; the corrosion resistance was excellent "X" denotes that the aluminum plate was severely corroded by the action of the local cell action; the corrosion resistance was poor

TABLE 5

| | Positive tab lead | Negative tab lead | Method of connection | Electric energy required for connection (kWs) | Connection property | Corrosion resistance |
|---|---|---|---|---|---|---|
| Comparative Example 1 | Aluminum plate | Copper plate/Ni plating | Welding | 10 | ○ | X |
| Example 15 | Aluminum plate/nickel partial plating/chitosan layer (Ni plating was formed on the entire surface (excluding the side edge face) of the region of the aluminum plate to be exposed to an outside of the outer cover) | Copper plate/Ni plating/Chitosan layer | Soldering | 0.1 | ○ | ⊙ |
| Example 16 | Aluminum plate/Ni partial plating/Chitosan layer | Copper plate/Ni plating/Chitosan layer | Soldering | 0.1 | ○ | ○ |
| Example 17 | Aluminum plate/Sn partial plating/Chitosan layer | Copper plate/Ni plating/Sn partial plating/Chitosan layer | Soldering | 0.1 | ○ | ○ |
| Example 18 | Aluminum plate/Solder partial plating/Chitosan layer | Copper plate/Ni plating/solder partial plating/Chitosan layer | Soldering | 0.1 | ○ | ○ |

In the aforementioned Examples and Comparative Examples, the surface roughness Ra of the aluminum plate and the surface roughness Ra of the nickel coating layer (plated layer) formed on the copper plane were adjusted by applying an embossing rolling method to each plate.

This application the aforementioned Items priority to Japanese Patent Application No. 2008-325521 filed on Dec. 22, 2008 and Japanese Patent Application No. 2009-126176 filed on May 26, 2009, and the entire disclosure each of which is incorporated herein by reference in its entirety.

It should be understood that the terms and expressions used herein are used for explanation and have no intention to be used to construe in a limited manner, do not eliminate any equivalents of features shown and mentioned herein, and allow various modifications falling within the aforementioned Itemed scope of the present invention.

INDUSTRIAL APPLICABILITY

The positive tab lead and negative tab lead can be preferably applied to, for example, a tab lead for a secondary battery such as a lithium secondary battery or a tab lead for a capacitor.

DESCRIPTION OF THE REFERENCE NUMERALS

1 . . . positive tab lead
2 . . . negative tab lead
11 . . . aluminum plate
13 . . . partial coating layer
14 . . . chitosan layer
21 . . . copper plate
22 . . . nickel plated layer
23 . . . partial coating layer
24 . . . chitosan layer
30 . . . battery
31 . . . outer cover
32 . . . battery main body
33 . . . positive electrode
34 . . . negative electrode
35 . . . electrolyte

The invention claimed is:

1. A positive tab lead comprising:
an aluminum plate;
a partial coating layer made of nickel, tin or solder formed on at least both sides of a region of the aluminum plate to be exposed to an outside of an outer cover; and
an insulating tab film thermally welded to both sides of a longitudinally intermediate region of the aluminum plate such that the insulating tab film extends over both of at least a portion of the region where the partial coating layer is formed and at least a portion of the region where the partial coating layer is not formed; wherein
the insulating tab film is not provided over an outer end region of the aluminum plate; and
an edge portion of the outer cover is arranged such that the edge portion pinches the insulating tab film, and the edge portion of the outer cover is sealed to the insulating tab film.

2. The positive tab lead as recited in claim 1, wherein a surface roughness Ra of the aluminum plate is 0.03 to 0.5 μm.

3. The positive tab lead as recited in claim 1, wherein a surface roughness Ra of a region of the aluminum plate where the partial coating layer is not formed is 0.03 to 0.5 μm.

4. The positive tab lead as recited in claim 1, wherein the partial coating layer is formed on an entire region of the aluminum plate to be exposed to the outside of the outer cover.

5. The positive tab lead as recited in claim 1, wherein a chitosan layer containing one or more compounds selected from a group consisting of chitosan and chitosan derivatives is further formed on a surface of the partial coating layer and the aluminum plate.

* * * * *